D. E. SOMES.
Temperature Equalizer for Buildings.
No. 44,229. Patented Sept. 13, 1864.
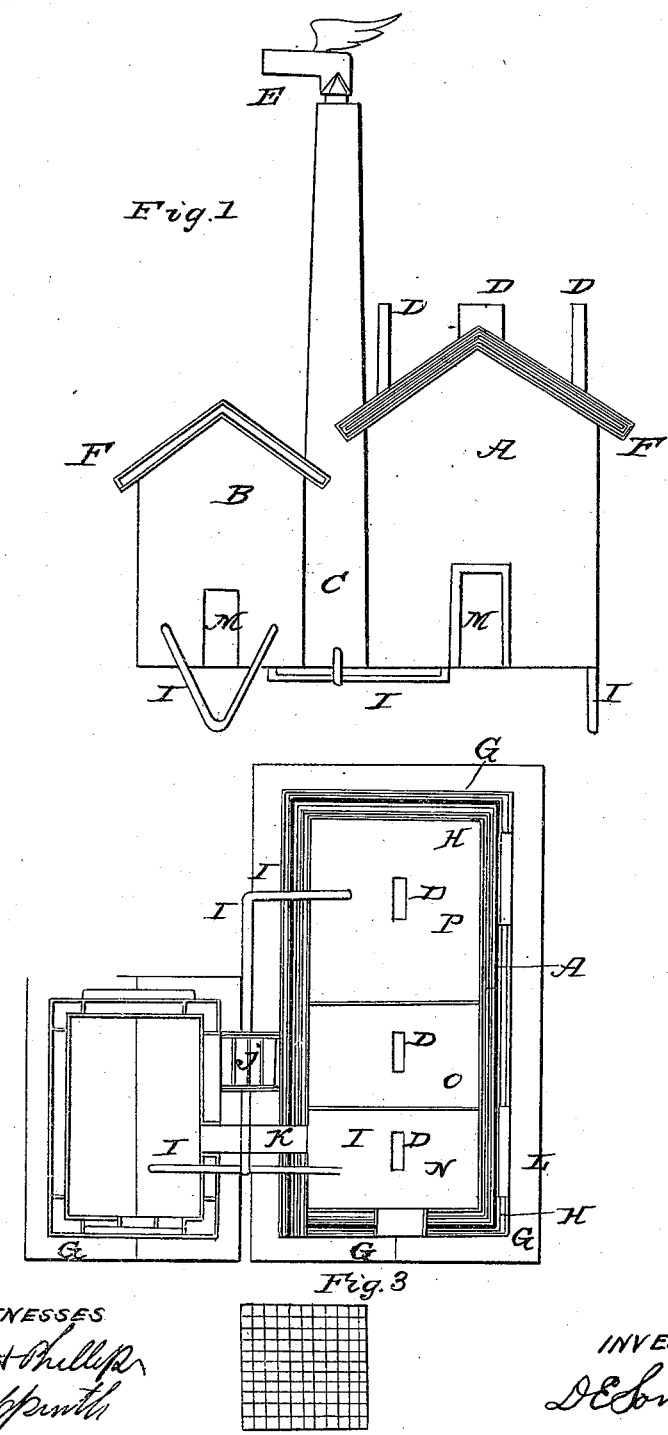
WITNESSES
INVENTOR

UNITED STATES PATENT OFFICE.

DANIEL E. SOMES, OF WASHINGTON, DISTRICT OF COLUMBIA.

IMPROVED MEANS OF SECURING A UNIFORM TEMPERATURE IN PACKING AND PRESERVING HOUSES, HOSPITALS, AND OTHER BUILDINGS.

Specification forming part of Letters Patent No. 44,229, dated September 13, 1864.

*To all whom it may concern:*

Be it known that I, DANIEL E. SOMES, of Washington, District of Columbia, have invented a new and useful Improvement in the Construction of Buildings; and I do hereby declare that the following is a full and exact description of the same, reference being had to the accompanying drawings, and to the letters of reference marked thereon.

The object of my invention is to secure a low and nearly-uniform temperature of the air within a given space throughout all seasons of the year, and it is applicable to the construction of buildings for curing and packing meat, preserving meats, vegetables, fruits, dairy-products, &c., to dwellings, churches, hospitals, and to any other structure where coolness and uniformity of temperature may be desirable.

It is a well-known fact that the natural state of the atmosphere is very cold, and that its warmth is owing to the sun's rays or to artificial heat. The effects of the sun's rays have therefore only to be excluded from any given space to secure a degree of cold proportionate to the completeness of the exclusion, and this principle forms the basis of my invention. It is also well known that animal and vegetable substances may be preserved for an almost indefinite space of time where a uniformly low temperature exists, and that heat and changes of temperature are the causes of disease and decomposition.

To accomplish the object of my invention I construct a building, substantially as shown in Figures 1 and 2, (the drawings representing a building for packing and salting meat, with slaughter-house attached,) with a series of walls, G G, with empty air-spaces H H between, or with chambers or spaces, a part or all of which may be filled with sawdust, tan-bark, charcoal, straw, or any other substance that is a non-conductor of heat. I also construct a series of floors with spaces between to exclude the heat of the earth from the building. By multiplying the number of walls and spaces the coldness can be increased and retained uniformly throughout the year.

When the building is intended for packing meat, vats containing water are placed under the roof, near the ventilators and at other places, to increase the degree of cold by means of evaporation, and pipes or open gutters are used for the same purpose and to convey the water to the vats.

For the purpose of ventilating the packing-house and for removing the animal heat and gases from the carcasses of the animals to prepare them for cutting and salting, I bring down air by means of the air-duct from a sufficient height to secure freshness and purity from vapor and dust, and force it, by means of machinery, through pipes extending below the surface of the ground in wells or trenches, and submerged in water, into the different apartments of the building. By this plan of conducting the air in pipes submerged as described, the air is cooled before being introduced into the building, and the temperature of the interior is not raised by the process of ventilation.

In a patent previously granted me I provided for bringing the air down by means of an air-duct and conducting it through pipes below the surface of the earth for the purpose of cooling it; but as the earth surrounding the pipes would be liable to become warm, the method described above of submerging the pipes in wells or fountains of water in excavations or trenches is an improvement thereon. If desired to still further cool the air, I may place ice in these wells or trenches, or any other cooling substance or mixtures. I may also cool the air in the pipes above the surface of the ground, in the building or out, by means of fountains, streams, or vats of cold water.

The method above described of cooling air in pipes may be applied to all classes of buildings and rooms.

For the purpose of purifying the air in any room or building and in packing-houses to aid in the curing of meats by introducing a larger quantity of carbon in the atmosphere, I place charcoal in the pipes through which the air passes.

In the accompanying drawings, Figure 1 represents a front elevation of a packing-house with slaughter-house attached; and Fig. 2, an inverted horizontal section of the same, showing the series of walls and air-chambers. Fig. 3 is the floor with openings.

A is the packing-house; B, slaughter-house; C, air-duct; D D D, ventilators; E, vane and pipe, with opening always facing the wind, for the purpose of conducting air to the pipes when the wind blows without the necessity of using the machinery for that purpose; F F, roofs constructed in the same manner as the walls described above; G G G G G, series of walls and roofs; H H H H, air chambers or spaces for non-conducting materials between; I, air-pipe; J, fan or blower; K, slide for conveying the carcasses of animals from the slaughter-house to the packing-house; L, projecting eaves; M M, doors.

The animal-carcasses are conveyed from the slaughter-house by means of the slide K to the cooling-room N in the packing-house. This cooling-room has a second floor with openings a few inches, more or less, above the main floor. The air is let in between the floors by means of the tubes and forced up through the openings through the upper floor onto the carcasses, thus expelling the animal-heat from the meat and preparing it to be cut up and salted. Space enough may be left between the two floors to admit of the introduction of a fan for the better distribution of the air.

What I claim as new and as my invention, and wish to secure by Letters Patent, is—

1. The slide K, constructed and used in the manner and for the purpose set forth.

2. The air-pipes I I, extending into wells, trenches, or any body or stream of water, with or without artificial refrigeration, substantially as described, for the purpose of cooling any building or room.

3. The air-pipes containing charcoal, for the purpose set forth.

4. The air-duct and air-pipes, when used in combination.

5. A floor with openings, substantially as described, and for the purpose specified.

6. A floor with openings, in combination with the air-pipes or air-duct, or both.

7. The use of water, substantially as described, for the purpose of lowering the temperature of any building or room by means of evaporation.

8. Constructing buildings, for the purpose herein set forth, with walls, floors, and roof so arranged as to maintain nearly a uniform temperature, in combination, the process and apparatus for cooling, substantially as set forth.

D. E. SOMES.

Witnesses:
CHARLES HERRON,
D. B. RICKER.